(12) United States Patent
Simon et al.

(10) Patent No.: US 10,689,031 B2
(45) Date of Patent: Jun. 23, 2020

(54) PASSIVE STEERING FOR TILTING VEHICLE

(71) Applicant: Ford Global Technologies, LLC, Dearborn, MI (US)

(72) Inventors: Marc Simon, Köln (DE); Lutz Eckstein, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/859,468

(22) Filed: Dec. 30, 2017

(65) Prior Publication Data

US 2018/0186404 A1 Jul. 5, 2018

(30) Foreign Application Priority Data

Jan. 2, 2017 (DE) .................. 10 2017 200 006

(51) Int. Cl.
| | |
|---|---|
| *B62D 7/00* | (2006.01) |
| *B62D 7/14* | (2006.01) |
| *B62D 7/20* | (2006.01) |
| *B60G 7/00* | (2006.01) |
| *B62D 9/02* | (2006.01) |
| *B60K 5/10* | (2006.01) |
| *B60G 3/20* | (2006.01) |

(52) U.S. Cl.
CPC .............. *B62D 7/146* (2013.01); *B60G 3/20* (2013.01); *B60G 7/001* (2013.01); *B60K 5/10* (2013.01); *B62D 7/20* (2013.01); *B62D 9/02* (2013.01); *B60G 2200/144* (2013.01); *B60G 2200/156* (2013.01); *B60G 2200/445* (2013.01); *B60G 2202/412* (2013.01); *B60G 2202/413* (2013.01); *B60G 2202/42* (2013.01); *B60G 2300/122* (2013.01); *B60G 2300/45* (2013.01); *B60Y 2200/122* (2013.01)

(58) Field of Classification Search
CPC . B62D 9/02; B62D 7/20; B62D 7/146; B60G 3/20; B60G 7/001
See application file for complete search history.

(56) References Cited

U.S. PATENT DOCUMENTS

| | | | | |
|---|---|---|---|---|
| 5,964,814 | A * | 10/1999 | Muller | B62D 6/00 |
| | | | | 180/412 |
| 6,173,221 | B1 * | 1/2001 | Boehringen | B62D 6/02 |
| | | | | 180/443 |
| 8,235,398 | B2 * | 8/2012 | Mercier | B62D 9/02 |
| | | | | 280/124.103 |
| 8,311,727 | B2 * | 11/2012 | Eckstein | B60K 35/00 |
| | | | | 701/532 |
| 8,836,545 | B2 * | 9/2014 | Eckstein | B60K 35/00 |
| | | | | 248/27.1 |
| 9,254,859 | B2 * | 2/2016 | Eckstein | B60K 31/042 |

(Continued)

*Primary Examiner* — Hau V Phan
(74) *Attorney, Agent, or Firm* — Raymond L. Coppiellie; Burgess Law Office, PLLC (57) ABSTRACT

A tilting vehicle having a steering system actively steering a front axle and a rear axle having two wheels that can be deflected individually in a vertical manner with respect to a vehicle body and that are independent of the steering system. The wheels of the rear axle can be steered by passive steering device configured to generate a steering force because of a vertical deflection of the wheels as the vehicle body tilts to one side. The steering force causing wheels to steer towards the opposite side.

10 Claims, 3 Drawing Sheets

(56) References Cited

U.S. PATENT DOCUMENTS

| | | | |
|---|---|---|---|
| 2008/0197597 A1* | 8/2008 | Moulene | B60G 21/007 280/124.103 |
| 2009/0312908 A1* | 12/2009 | Van Den Brink | B62D 9/02 701/38 |
| 2010/0274445 A1* | 10/2010 | Haynes | B62H 1/12 701/36 |
| 2013/0207363 A1* | 8/2013 | Mighell | B62K 5/027 280/124.103 |
| 2014/0312580 A1* | 10/2014 | Gale | B60G 21/073 280/5.509 |
| 2014/0353940 A1* | 12/2014 | Bartolozzi | B60G 3/01 280/269 |
| 2015/0274160 A1* | 10/2015 | Lee | B62D 6/002 701/41 |
| 2016/0031515 A1* | 2/2016 | Andreev | B60G 21/05 180/218 |
| 2016/0144680 A1* | 5/2016 | Simon | B60G 3/20 280/124.103 |

* cited by examiner

PASSIVE STEERING FOR TILTING VEHICLE

CROSS-REFERENCE TO RELATED APPLICATIONS

Not Applicable.

BACKGROUND OF THE INVENTION

1. Field of the Invention

A tilting vehicle suspension, and more specifically, a passive suspension for a vehicle having wheel that can be deflected in a vertical manner.

2. Description of Related Art

Lateral forces occurring when non-rail-borne vehicles negotiate curves cause two kinds of problems. First, establishing a required frictional force between the wheels and the travel surface to reduce occurrence of vehicle move out or slide out in a curve. Second, reducing any tilting moment that could otherwise cause the vehicle to tip over. Considered in the reference system of the vehicle, the centrifugal force together with the weight force produces a resulting force directed downwards in an inclined manner. With two-track vehicles having a normal or a wide track width, such as conventional passenger cars or commercial trucks, the projection of the vehicle center of gravity lies in the direction of the resulting force between the wheel contact points, making it difficult for the vehicle to tip over. With single-track vehicles, such as motorcycles or bicycles, it is necessary for the driver to tilt the vehicle, using steering or a weight displacement, so the common center of gravity of the driver and the vehicle regarding the wheel contact line lies in the direction of the resulting force.

A similar stability problem arises with multi-track vehicles, in particular two-track vehicles on at least one axle and having a small track width. Wherein a tilting moment, even in comparatively low velocities or relatively large curve radii, could tip the vehicle. These vehicles often use tilting technology that tilts part of the vehicle body with respect to the travel surface. Such tilting often achieved by raising the wheel on the inside of the curve in the direction of the vertical axis or Z-axis of the vehicle body and lowering the wheel on the outside of the curve. Such systems may use an active tilting technology, wherein at least one actuator supports or adjusts the tilt of the vehicle body. It is necessary, particularly with increased vehicle mass or load-carrying capacity, for the actuator to be a high-powered actuator, which is often heavy, causing an overall disadvantageous effect on vehicle energy consumption of the vehicle and on actuator costs.

SUMMARY OF THE INVENTION

A vehicle having a steering system and a rear axle having two wheels, said wheels individually deflectable vertically to a vehicle body and independent of the steering system. The vehicle includes a passive steering mechanism linked to said wheels wherein a vertical deflection of the wheels generates a steering force causing said wheels to turn towards a side of the vehicle.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. In the different figures, like parts are always provided with identical reference numerals and for this reason said parts are generally only described once.

Figure 1:
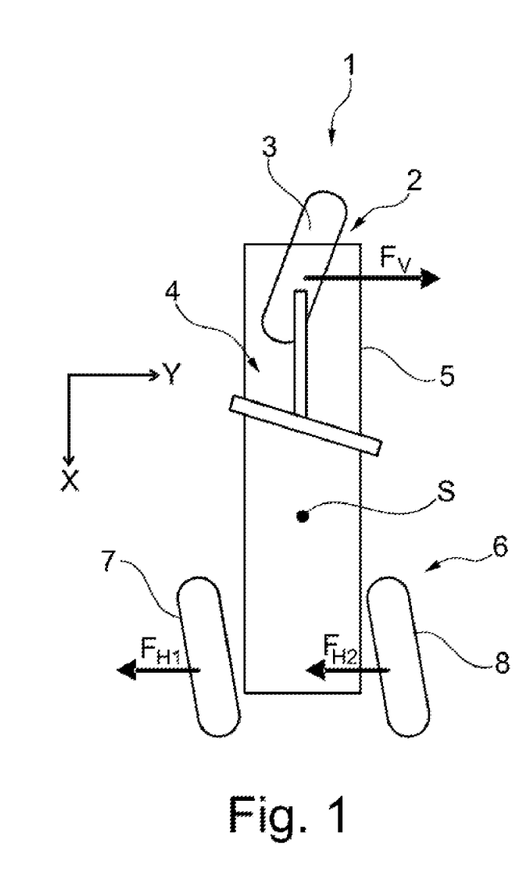
FIG. 1 is a schematic, plan view of a tilting vehicle according to an embodiment of the invention shown negotiating a curve.

FIG. 1 shows a vehicle 1 according to an exemplary embodiment of the present invention negotiating a curve. The vehicle 1 includes a front axle 2 having a single front wheel 3 actively steered by a driver using a steering system 4. The steering system 4 illustrated schematically as a combination of a steering rod and handlebar; however, the system 4, may for example, have a steering wheel. The force transmission from the steering system 4 to the wheel 3 can be more complicated and where necessary supported by a servo motor.

Figure 2:
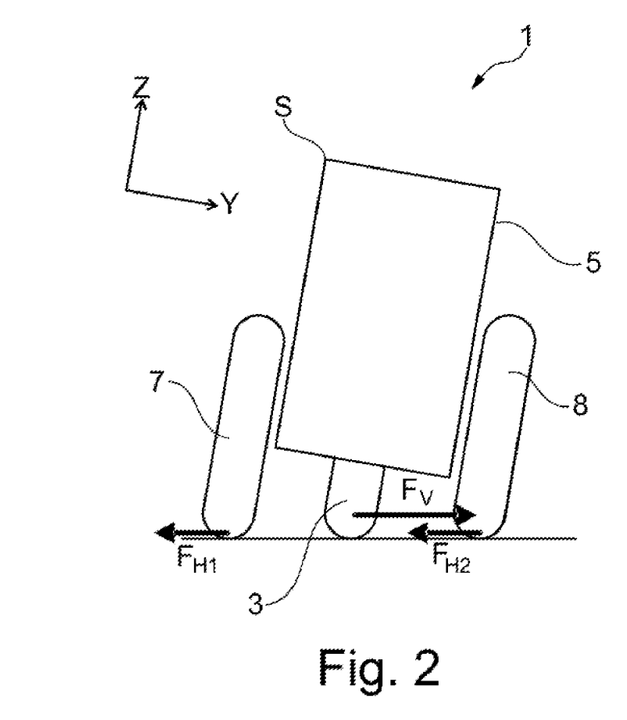
FIG. 2 is a schematic rear view of the tilting vehicle of FIG. 1.

The front wheel 3 and steering system 4 are arranged on a vehicle body 5 that carries the driver and any payload. As shown, the vehicle body 5 includes a rear axle 6 having two rear wheels 7, 8. FIGS. 1 and 2 illustrate the vehicle 5 traveling along a right-hand curve, wherein the front wheel 3 is turned to the right. The vehicle 1 in the present example uses a tilting technology whereby the rear wheels 7, 8 individually deflect along a vertical axis or Z-axis of the vehicle body 5. FIG. 2 shows the wheel 7 on the outside of the curve is deflected downwards and the wheel 8 on the inside of a curve is deflected upwards with respect to the vehicle body. As shown the vehicle body 5 tilts or pivots about its longitudinal axis or X-axis. Tilting the vehicle reduces possible tilting moments correspondingly reducing the possibility that one of the wheels 3, 7, 8 loses contact with the travel surface. The amount or degree of vehicle tilt may be influenced or controlled with an actuator, not illustrated, operating or acting in a known manner on a suspension of the rear wheels 7, 8.

When negotiating a curve, the front wheel 3 tilts or is inclined at an angle with respect to the momentary direction of movement of the vehicle center of gravity S, a sideward-acting force Fv is produced as a result of the friction between the front wheel 3 and the travel surface, FIGS. 1 and 2 show only the component acting in the Y-direction since the component acting in the X-direction is irrelevant for present considerations. FIG. 2 shows the force Fv produces a turning moment with respect to the vehicle center of gravity S that causes the vehicle 1 to tip or tilt to the left, that is out of the curve. Compensating for the turning moment and maintaining a desired tilt normally requires a high-powered, and heavy, actuator.

In the present example, the vehicle 1 illustrated in FIGS. 1 and 2, utilizes tilting technology; however, the power consumption and weight of the actuator may be kept small because the vehicle 1 utilizes a passive steering device that turns the rear wheels 7, 8 in an opposite direction to the front wheel 3. As shown in FIGS. 1 and 2 when the vehicle tilts to one side, to the right in FIG. 2, the passive steering device turns the rear wheels 7, 8 to the opposite side, to the left in FIG. 1. As illustrated in FIGS. 1 and 2, sideward-acting forces $F_{H1}$, $F_{H2}$ directed against the force Fv are also produced at the rear wheels 7, 8. Wherein, the ratio of the forces with respect to one another depends upon the steering angle of the different wheels 3, 7, 8 and on the respective axle load that influences the frictional force. The lengths of the force vectors illustrated in FIGS. 1 and 2 are to be understood in an exemplary manner and can deviate from the actual conditions. Also, for clarity, force components that act in a perpendicular manner with respect to the travel surface and result from the weight force are omitted.

Figure 3:
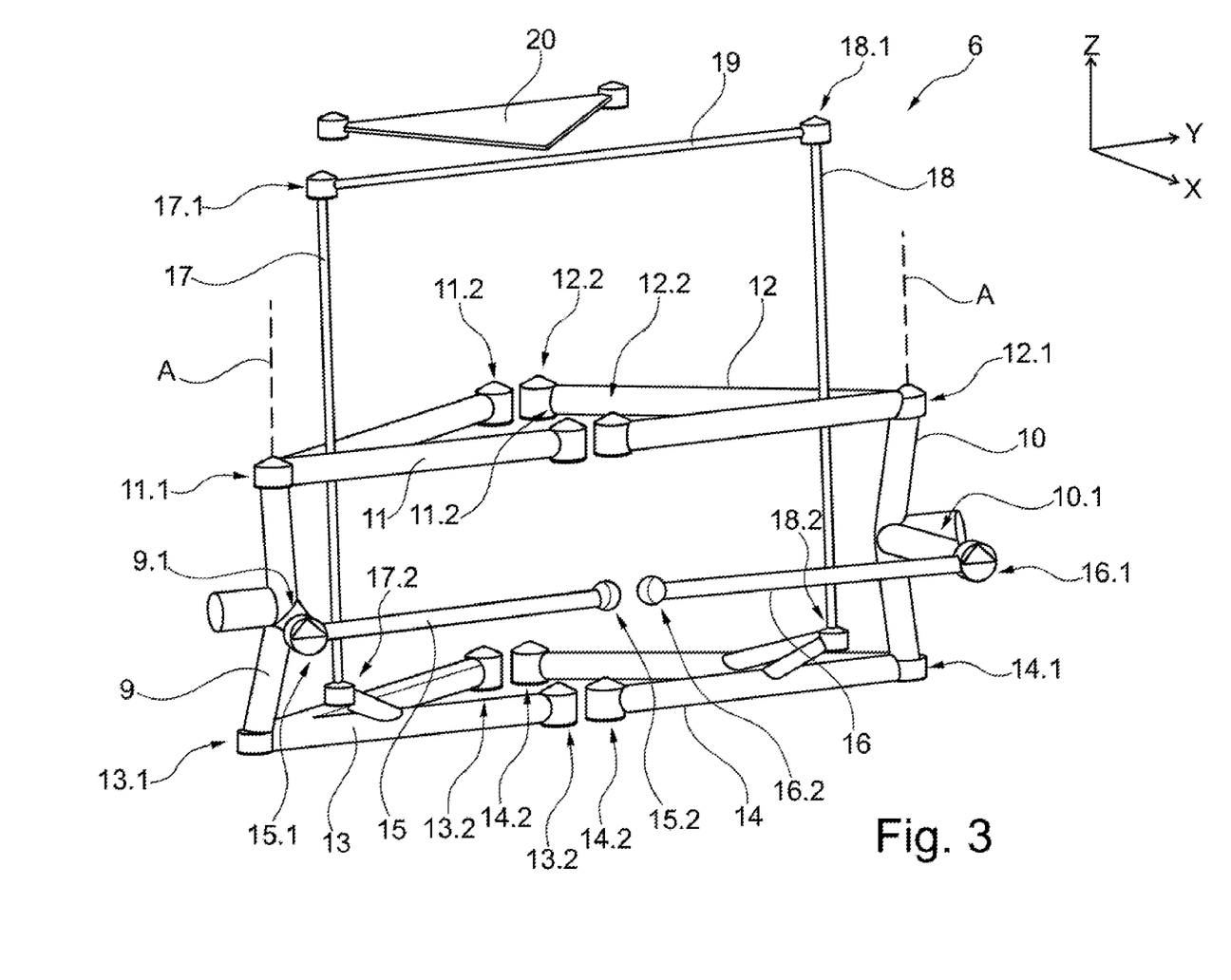
FIG. 3 is a schematic view of suspension components of a rear axle of the vehicle of FIG. 1.

FIG. 3 schematically shows one example of the passive steering device associated with the rear axle 6. The rear axle 6 configured as a double wishbone axle, wherein two wheel carriers 9, 10 are connected to the vehicle body 5 with an upper wishbone 11, 12 and a lower wishbone 13, 14. The rear wheels 7, 8, not illustrated, are rotatably mounted on the wheel carriers 9, 10. Wheel-side connection sites 11.1, 12.1, 13.1, 14.1 of the upper wishbones 11, 12 and of the lower wishbones 13, 14, define pivot axes A of the wheel carriers 9, 10. The wheel carriers together with the rear wheels 7, 8 pivot about the respective pivot axes A. The vehicle-side connection sites 11.2, 12.2, 13.2, 14.2 mount the upper and lower wishbones 11, 12, 13, 14 in a pivotable manner on the vehicle body 5, making it possible for both of the wheel carriers 9, 10 to deflect in a vertical direction, in the Z-direction. Because the upper and lower wishbones 11, 13 are oriented parallel with one another, the orientation of the wheel carrier 9, 10 does not change and the support of the rear wheels 7, 8 remains identical. The lower wishbones 12, 13 connect, by way of lower coupling rod joints 17.2, 18.2, to vertically extending coupling rods 17, 18. The coupling rods 17, 18 connected, by way of upper coupling rod joins 17.1, 18.1, to a balancer 19 cooperating with a balancer holder 20. An actuator, not illustrated, acts on the balancer 19 to adjust the tilt of the vehicle body 5.

Steering levers 9.1, 10.1 connected to the wheel carriers 9, 10 extend rearwards, towards the rear of the vehicle 1. Track rods 15, 16 are connected, using outer track rod joints 15.1, 16.1 at respective ends of the track rods 15, 16, to the steering levers 9.1, 10.1. The track rods 15, 16 are shown as straight and rigid members connected by way of inner track rod joints 15.2, 16.2 to the vehicle body 5. All track rod joints 15.1, 15.2, 16.1, 16.2 can be configured as ball joints.

The inner track rod joints 15.2, 16.2 are slightly offset in the upwards direction with respect to the outer track rod joints 15.1, 16.1 in the direction of the Z-axis. When negotiating a curve, as illustrated in FIGS. 1 and 2, the wheel carrier 10 on the inside of the curve deflects upwards and the wheel carrier 9 on the outside of the curve deflects downwards. This leads to the vertical spacing between the inner and outer track rod joints 16.1, 16.2 being reduced. Wherein the track rod 16 on the inside of the curve, because of the constant length of the rigid track rod 16, moves the outer track rod joint 16.2 outward, away from the vehicle middle, and pushes the steering lever 10.1 outward. Pushing the steering lever 10.1 outward causes the associated wheel 8 to steer to the left as shown in FIG. 1. Regarding track rod 15 on the outside of the curve, the vertical spacing between the inner and the outer track rod joint 15.1, 15.2 increases, as a result the steering lever 9.1 is drawn inwards, towards the vehicle middle and turning the associated wheel 7 to the left. Therefore, passive steering of the rear axle 6 is achieved in the desired manner.

The spring and/or damping elements normally part of the suspension of the rear wheels 7, 8 are, for clarity, not illustrated in FIG. 3.

FIG. 3 shows the outer track rod joints 15.1, 16.1 behind the pivot axes A of the wheel carriers 9, 10 and below the inner track rod joints 15.2, 16.2. A practically identical passive steering behavior is possible with the steering levers 9.1, 10.1 oriented towards the front and the outer track rod joints 15.1, 16.1 lying in front of the pivot axes A, whereas they are offset upwards with respect to the inner track rod joints 15.2, 16.2.

Figure 4:
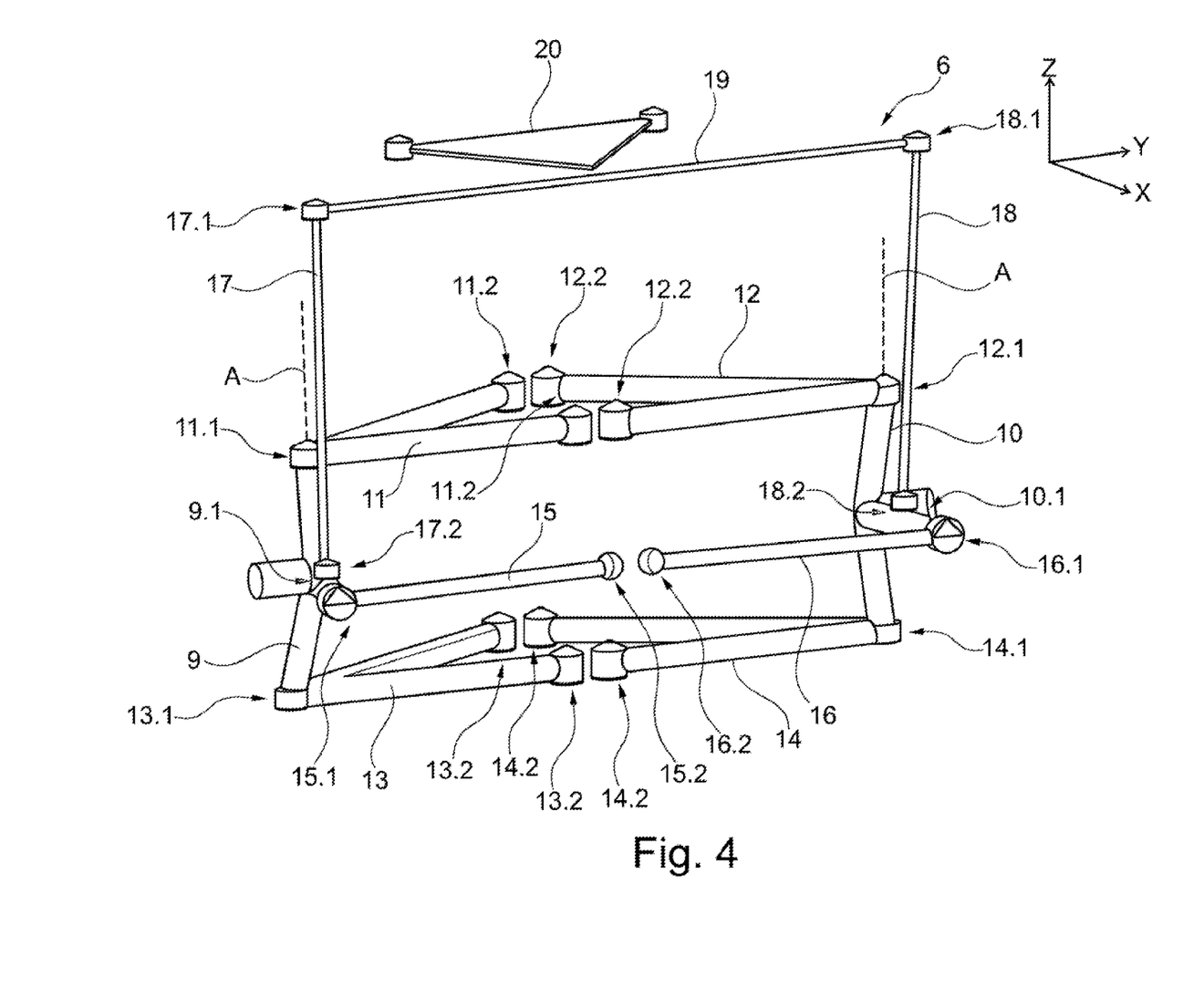
FIG. 4 is a schematic view of suspension components of a rear axle in accordance with an alternative embodiment.

FIG. 4 illustrates an alternative embodiment of the suspension of the rear axle 6 similar to the embodiment illustrated in FIG. 3 and the similarities are not described again. In contrast to FIG. 3, the coupling rods 17, 18 are not connected to the lower wishbones 13, 14 but are connected to the steering levers 9.1, 10.1 of the wheel carriers 9, 10. The balancer 19 is longer and extends further in the transverse direction wherein the lateral spacing of the upper coupling rod joints 17.1, 18.1 is greater than the lateral spacing of the lower coupling rod joints 17.2, 18.2. The vertically extending coupling rods 17, 18 in this example are inclined inwards in the downwards direction, towards the vehicle middle.

If the actuator exerts a force on the balancer 19, wherein the wheel carriers 9, 10 are influenced by a vertical force component along the respective coupling rods 17, 18, and correspondingly influencing the tilt of the vehicle body 5, the inclined position of the coupling rods 17, 18 produces a horizontal force component that, by way of the steering levers 9.1, 10.1, causes a steering force acting directly on the respective wheel carriers 9, 10. The horizontal force occurs independently of the tilt of the vehicle body 5, and in particular when a tilt is not provided. For example, at the start of negotiating a curve it is possible to achieve limited steering of the wheels 7, 8, even if, as a result of the inertia of the vehicle body 5, the vehicle body 5 has not noticeably tilted. The elastokinematic characteristic of the different components of the rear axle 6 render it possible to steer the wheels 7, 8 independently of the tilt, the steering normally being limited with respect to time and/or the possible angle. Because the components, and in particular the different articulated joints connected to one another, have him a certain elasticity, relative movements are possible that would otherwise not be possible with rigid elements.

At the start of negotiating a curve, it is possible using an actuator and a coupling device formed by the balancer 19 and the coupling rods 17, 18 to exert a steering force on both of the wheel carriers 9, 10 causing the wheels 7, 8 to turn to a limited extent. When negotiating a curve as illustrated in FIGS. 1 and 2, the actuator influences, by way of the balancer 19 the coupling rod 17 on the outside of the curve with a pressure force that as a result of the tilt of the coupling rod 17 has a force component directed inwards towards the vehicle middle. This acts on the associated steering lever 9.1 and generates a turning moment on the wheel carrier 9 that is on the outside of the curve about its pivot axis A so the wheel carrier is deflected slightly out of the curve. In a corresponding manner, a pulling force acts on the coupling rod 18 that is on the inside of the curve and the pulling force generates by way of the steering lever 10.1 a matching turning moment on the wheel carrier 10 about its pivot axis A. The steering effect can be limited, for example the angle of turn of the wheel carriers 9, 10 can be less than 1°; however, it still helps to produce the desired tilt of the vehicle body 5.

As discussed above regarding FIG. 3, the steering levers 9.1, 10.1 can be oriented towards the front. To achieve the desired steering effect, the two coupling rods 17, 18 extend outwards in the downwards direction in an inclined manner, the spacing of the lower coupling rod joints 17.2, 18.2 must be greater than the spacing of the upper coupling rod joints 17.1, 18.1.

As shown in the disclosed embodiments, the tilting vehicle 1 has a front axle 2 actively steered by way of a steering system 4 and a rear axle 6 with rear wheels 7, 8 that deflect individually in a vertical manner, up and down with respect to the vehicle body 5 and that are independent of the steering system 4. As described herein the vehicle 1 is a tilting vehicle, wherein it is possible to change a tilt of a vehicle body with respect to the travel surface without having to raise the wheels from the travel surface. This describes in particular three or four-wheeled vehicles in which two wheels are arranged adjacent to one another on at least one axle. The tilt is a lateral tilt in a transverse manner with respect to the longitudinal axis or X-axis of the vehicle. Generally, the vehicle is a non-rail-borne tilting vehicle. While feasible to apply to vehicles operated at least in part by muscle power, the tilting vehicle is normally a motor vehicle. This motor vehicle can be for example electrically driven or driven by an internal combustion engine. The front axle of the tilting vehicle may have one or a multiple of, in particular two, wheels that lie adjacent to one another. The vehicle is actively steered with a steering system. The term "actively" means that a driver can directly adjust the steering angle of the front axle with the steering system. The driver can perform the corresponding adjustment by way of a handlebar, a steering wheel or another operating element. The adjustment can be transmitted by the steering system to the wheel or wheels of the front axle and this can be performed with a direct force transmission or with a servo system.

The tilting vehicle 1 includes a rear axle having two wheels. These wheels are part of a rear axle 6 and therefore are naturally arranged adjacent to one another in the transverse direction, Y-axis. The wheels can be deflected individually in a vertical manner with respect to a vehicle body, wherein the term "vertical" describes a deflection, up or down, in the direction of the vertical axis or Z-axis, of the vehicle body. If the vehicle body tilts, this vertical direction differs from the vertical direction with respect to the travel surface. The deflection of the respective wheels can be coupled to a deflection in the non-vertical direction, toward the X-axis and/or Y-axis. The wheels 7, 8 are suspended in such a manner that a corresponding vertical deflection is possible, wherein at least one spring element and/or at least one damping element can be coupled affecting the deflection. The deflection can be influenced by one or multiple actuators. The term "can deflect individually" means that with one wheel deflecting, the respective other wheel can deflect differently. It is unnecessary for the deflections to be independent of one another but rather a certain coupling can be produced between the deflections for example, a deflection of one wheel in the upwards direction supports a deflection of the other wheel in the downwards direction.

This can be brought about with a stabilizer or balance beam coupled on the outer face to the suspensions of the two wheels and in the middle to the vehicle body. In each case, the wheels 7, 8 of the rear axle 6 are independent from the steering system 4, they are not coupled to the steering system. As illustrated, the steering system 4 does not influence the wheels 7, 8 of the rear axle 6 directly. Because the rear wheels 7, 8 can be deflected individually, it is possible for the vehicle body 5 to tilt with respect to the travel surface. In a curve, the vehicle body 5 can tilt in the direction of the curve center, wherein the wheel on the inside of the curve is deflected in the upwards direction, towards the vehicle body 5 and the wheel on the outside of the curve is deflected in the downwards direction, away from the vehicle body 5. If the front axle includes, for example two adjacent-lying wheels, the wheels can likewise be deflected to render it possible for the vehicle body to tilt.

Normally, the vehicle comprises only the front axle and the rear axle but in principle it is however also possible for the vehicle to have three or more axles.

The wheels 7, 8 of the rear axle 6 can be steered with the passive steering device or mechanism disclosed herein and configured to generate a steering force based on a vertical deflection of the wheels 7, 8 as the vehicle body 5 tilts to one side wherein the steering force causes the wheels 7, 8 to steer towards the opposite-lying side. The steering device is passive, it is directly influenced by the driver. If the tilting vehicle tilts, a different vertical deflection is produced for the two rear wheels, a deflection in the direction of the Z-axis. The steering device configured so this vertical deflection produces a steering force on the wheels 7, 8. The steering force is such that when the vehicle tilts to one side, for example to the right, the wheels steer towards the opposite-lying side, for example to the left. In a curve in which the vehicle body tilts in the direction of the curve center, the rear wheels therefore turn away from the curve center or out of the curve. It is unnecessary for the two wheels to turn to the same extent, they can be oriented in a non-parallel manner with one another.

When negotiating a curve, the rear wheels 7, 8 are also steered, wherein with an identical steering angle of the front axle a smaller curve radius is possible and the tilting of the vehicle is supported. This is clear if consideration is given to the turning moments acting on the vehicle in a static reference system, the reference system of the travel surface. In this reference system, the change of direction of the vehicle results from the interaction of the travel surface with the wheels inclined with respect to the travel direction. These produce a force on the center of gravity of the vehicle that results in the desired change of direction. Since the corresponding forces act below the center of gravity, these lead to turning moments. With the front axle that steers to a certain extent into the curve a force is produced in the direction of the curve center so that the associated turning moment tips the vehicle away from the curve center. In contrast, the passively steering rear axle steers to a certain extent out of the curve producing a force directed away from the curve center and producing a turning moment that tips the vehicle in the direction of curve center, in the direction of the desired tilt. The turning moment produced at the rear wheels guides the vehicle into the curve. The two turning moments directed in opposite directions by the front axle and the rear axle cancel each other out at least in part. As soon as the vehicle tilts, it is necessary to consider a turning moment that results from the weight force. Because the turning moments at least in part compensate for one another, a considerably smaller turning moment is required to produce an optimum tilt of the vehicle or to hold the vehicle in an optimum tilt. It is therefore unnecessary to provide a disproportionally high-powered and heavier actuator for adjusting the tilt. The energy consumption and the vehicle weight can therefore be reduced.

The tilting vehicle typically includes an actuator influencing the tilt of the vehicle body. The actuator acting, for example, directly or indirectly on the wheels of the rear axle or on their suspension to influence their vertical deflection directly associated with the tilt of the vehicle body. The actuator can operate in an electrical, hydraulic or pneumatic manner. Such an actuator can be configured with a corresponding control device to produce and maintain a desired tilt adjusted to the velocity and curve radius. The function of such an actuator can, where necessary, be supported by the weight of a driver being displaced.

In a preferred embodiment, passive system includes the wheels 7, 8 of the rear axle 6 arranged on wheel carriers 9, 10 and connected by way of upper and lower wishbones 11, 12, 13, 14 to a vehicle body 5, wherein wheel-side connection sites of an upper and a lower wishbone define a pivot axis A of a wheel carrier 9, 10. The assembly may also be described as a double wishbone axle. On the vehicle side, each wishbone may be pivotably mounted on the vehicle body, for example, by way of two vehicle-side connection sites. In each case suitable bearings that make the pivot movement possible can be provided on or at the connection sites. Because the wheel carriers 9, 10 attached at the wheel-side connection sites on the wheel carrier can pivot, the wheel carrier 9, 10, including the wheel arranged thereon, may be deflected in a vertical manner. The two wishbones normally extend parallel to one another so the support of the respective wheel does not change during the pivot procedure. However, it is feasible to select a different design to influence the support in a systematic manner. In one example, ball joints or comparable bearings making possible a pivot moment on all sides are provided on the wheel-side connection sites. As a consequence, as described, a pivot axis of the wheel carrier is defined that normally extends parallel to the vertical axis or Z-axis of the vehicle. The steering movement of the wheel occurs around this pivot axis.

The passive system of the exemplary embodiment may include a balancer 19 extending in the transverse direction or Y-direction and connected in an articulated manner to two coupling rods 17, 18 extending in the downwards direction and connected in an articulated manner to the upper or lower wishbones. The balancer 19 is an elongated component extending in the transverse direction and made, for example, from steel. An above-described actuator acts on the balancer 19 and influences its tilt about the longitudinal axis or X-axis of the vehicle. The balancer 19 influences the wishbones 11, 12, 13, 14, by way of the coupling rods 17, 18 by transmitting an actuator force influencing the tilt and ensuring at least an almost uniform counter movement of the wishbone.

A further embodiment combined with the above described embodiment, includes the wheels 7, 8 of the rear axle 6 arranged on wheel carriers 9, 10, wherein the passive steering device includes at least one track rod 15, 16 connected to the vehicle body 5 by at least one inner track rod joint 15.2, 16.2 and connected to a steering lever 9.1, 10.1 of a wheel carrier 9, 10 by way of an outer track rod joint 15.1, 16.1, wherein when the vehicle is travelling in a straight direction the outer track rod joints 15.1, 16.1 and the at least one inner track rod joint 15.2, 16.2 are arranged in a vertical manner at different heights. The term "vertical" also describes the direction of the Z-axis of the vehicle body.

The steering levers 9.1, 10.1 are normally connected in a rigid manner to the respective wheel carrier 9, 10 and when the vehicle is travelling in a straight direction the steering levers extending, for example, parallel to the longitudinal axis of the vehicle. The track rod engages a respective steering lever by way of an outer track rod joint that can be configured as a ball joint. By the different vertical arrangement of the inner track rod joint 15.2, 16.2 and the outer track rod joint 15.1, 16.1, the spacing of the outer track rod joint from the vehicle middle changes with the vertical position of the wheel carrier and the steering lever arranged thereon. As a consequence, the steering lever is deflected, wherein the respective desired steering effect is achieved by a suitable position of the inner track rod joint. The track rod 15, 16 is normally configured in a rigid manner.

The disclosed embodiment may be formed with one track rod connected to the vehicle body by way of an inner track rod joint. If so, the inner track rod joint must be vertically displaceable on the vehicle body so the track rod does not block the normal deflection of the rear wheels. Such a single track rod could be configured, for example, in a bent manner, V-shaped, or curved manner, U-shaped, wherein the middle portion with the inner track rod joint forms the highest or lowest point.

In an exemplary embodiment, the passive steering device includes two track rods connected respectively, by an inner track rod joint, to the vehicle body and by an outer track rod joint, to a steering lever of a wheel carrier. The inner track rod joints may be configured, for example, as ball joints. Their position on the vehicle body is preferably fixed or at least can be fixed. The track rods move independently of each another so during the deflection procedure the track rods follow the movement of the wheel carriers, with the steering levers arranged thereon, in the same direction as to follow the movement in the opposite direction as the vehicle tilts. Normally, the track rods extend somewhat in the Y-Z plane spanned by the transverse axis and the vertical axis of the vehicle, however, deviations therefrom are also possible.

Regardless of whether one or two track rods are used, the describe embodiments are possible and the desired steering behavior can be achieved. With one embodiment, each outer track rod joint is arranged behind the pivot axis of the wheel carrier and lower than the at least one inner track rod joint. The term 'behind' means "arranged closer to the rear of the vehicle". The steering levers at the wheel carrier face rearwards so the respective wheel steers inwards if the steering lever is moved outwards. The terms "lower" and "higher" relate in this case to the arrangement with respect to the vertical axis or Z-axis of the vehicle body. For the wheel on the inside of the curve, the wheel carrier moves the steering lever upwards during the tilting procedure so the outer track rod joint also moves upwards. The vertical spacing with respect to the inner track rod joint reduces, as a consequence it is necessary for the horizontal spacing to increase, the track rod joint and the steering lever move outwards with regard to the vehicle middle. For the wheel on the outside of the curve, the vertical spacing increases and the horizontal spacing reduces, at that site the steering lever moves inwards with regard to the vehicle middle.

With an alternative embodiment, each outer track rod joint is arranged in front of the pivot axis of the wheel carrier and higher than the at least one inner track rod joint. Here, it is to a certain extent a reverse of the above described embodiment, wherein however the steering effect of the steering lever is reversed and therefore the effect of the at least one track rod on the steering lever must also be reversed.

The passive steering can be supplemented wherein the wheels of the rear axle may be steered at least to a limited extent independently of the tilt of the vehicle body by way of a coupling arrangement connected to the actuator. Wherein the particular actuator mentioned above by way of which the tilt of the vehicle body can be influenced. Here, the actuator has a dual function. The actuator influences the tilt that indirectly influences the steering angle of the wheels by way of the passive steering device. Further, the actuator acts on the wheels by way of the coupling arrangement and steers the wheels. The latter effect is at least to a limited extent independent of the tilt of the vehicle body, in particular independent of whether a tilt is present. The term "to a limited extent" can mean both the time period and also the possible steering angle of the wheels.

According to the definition, the actuator also influences the tilt of the vehicle body, wherein the corresponding effect occurs with a certain time delay because of the inertia of the mass of the vehicle body and also of the driver. The same applies for the steering effect produced by way of the passive steering device. It is possible by way of the coupling arrangement and particularly during the time periods in which the actuator could still not cause any noticeable change in the tilt for the wheels to be steered in such a manner that the passive steering device is correspondingly controlled in a qualitative manner. If the actuator functions to generate a tilt of the vehicle on one side, a steering force is exerted by way of the coupling device and the steering force causes the wheels to turn to the opposite side. Whereas the above described passive steering device normally relates to a kinematic effect, the function of the described coupling arrangement is normally associated with an elastokinematic effect, such a steering procedure independent of the tilt of the vehicle body is only possible by the fact that specific parts of the suspension and in particular the joints that connect them are not configured in a rigid manner but are configured in an elastic manner.

A wide variety of options are available with respect to the embodiment of the coupling arrangement. Under one embodiment, the coupling arrangement includes a balancer extending in the transverse direction and acted upon by the actuator. The coupling arrangement including vertically extending coupling rods connected to the balancer in an articulated manner and also connected to the wheel carriers. The wheel carriers may be connected to the vehicle body by way of an upper and lower wishbone. The balancer includes an elongated component extending in the transverse direction and made, for example, from steel. However, in additional embodiments described here, the coupling rods are not attached to the wishbones but are attached to the wheel carriers. It is possible, on the one hand to transmit a vertically acting force component to the wheel carriers wherein the force component raises or lowers the wheel carriers compared to the vehicle body and influences the tilt of the vehicle. It is also possible to exert a steering force on the wheel carriers independent of the tilt of the vehicle body.

The latter is for example possible by the coupling rods being connected to the balancer by upper coupling rod joints and are connected to the steering levers of the wheel carriers by the lower coupling rod joints wherein a lateral spacing of the upper coupling rod joints differs from the lateral spacing of the lower coupling rod joints. The lateral spacing describes in this case the spacing in the transverse direction or Y-direction of the vehicle. Which of the two lateral spacings is greater depends upon the orientation of the steering lever. If the steering levers extend towards the rear, then the spacing of the upper coupling rod joints is greater. If the steering levers extend towards the front, the spacing of the lower coupling rod joints is greater. In the first case, the coupling rods are therefore tilted inwards to a certain extent. As the vehicle negotiates a curve, the actuator exerts by way of the corresponding coupling rod a downwards force on the wheel carrier on the outside of the curve. Because of the inclined position of the coupling rod, an inwardly directed force component with a rearwards oriented steering lever steers the corresponding wheel out of the curve. A vertically upwards directed force is exerted on the wheel carrier on the inside of the curve and because of the inclined position of the coupling rod the force generates an outwardly directed force component that also steers the wheel carrier on the inside of the curve out of the curve.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A tilting vehicle having a front axle which can be actively steered by way of a steering system and a rear axle having two wheels that can be deflected individually in a vertical manner with respect to a vehicle body and that are independent of the steering system, wherein the wheels of the rear axle can be steered by a passive steering device configured to generate a steering force as a result of a vertical deflection of the wheels as the vehicle body tilts to one side and said steering force causes said wheels to steer towards the opposite-lying side.

2. The tilting vehicle of claim 1 including an actuator for influencing the tilt of the vehicle body.

3. The tilting vehicle of claim 2 wherein the wheels move to a limited extent independently of the tilt of the vehicle body by way of a coupling arrangement connected to the actuator.

4. The tilting vehicle of claim 3 wherein the coupling arrangement includes a balancer extending in a traverse direction and acted upon by the actuator, and two vertically extending coupling rods are connected to the balancer in an articulated manner, said coupling rods being connected to the wheel carriers in an articulated manner.

5. The tilting vehicle of claim 4 wherein the coupling rods are connected to the balancer by upper coupling rod joints and to the steering levers of the wheel carriers by lower coupling rod joints, wherein a lateral spacing of the upper coupling rod joints differs from a lateral spacing of the lower coupling rod joints.

6. The tilting vehicle of claim 1 wherein the wheels of the rear axle are arranged on wheel carriers connected by way of upper and lower wishbones to a vehicle body wherein wheel-side connection sites of an upper and a lower wishbone define a pivot axis of a wheel carrier.

7. The tilting vehicle of claim 1 wherein the wheels of the rear axle are arranged on the wheel carriers, and wherein the passive steering device comprises at least one track rod connected to the vehicle body by an inner track rod joint and to a steering lever of a wheel carrier in by an outer track rod joint, wherein when travelling in a straight direction the outer track rod joint and the inner track rod joint are arranged at different heights.

8. The tilting vehicle of claim 7 wherein the passive steering device includes two track rods connected respectively by inner track rod joints to the vehicle body and by outer track joints to respective steering levers of wheel carriers.

9. The tilting vehicle of claim 8 wherein each outer track rod joint is behind the pivot axis of the wheel carriers and lower than the inner track rod joints.

10. The tilting vehicle of claim 8 wherein each outer track rod joint is arranged in front of the pivot axis of the wheel carriers and higher than the inner track rod joints.

\* \* \* \* \*